(12) United States Patent
Kasiraj et al.

(10) Patent No.: US 9,260,113 B2
(45) Date of Patent: Feb. 16, 2016

(54) METHOD AND DEVICE FOR GENERATING A CONTROL PARAMETER FOR A DISTANCE CONTROL SYSTEM OF A VEHICLE

(71) Applicants: Ganesh Kasiraj, Lindau (DE); Florian Hauler, Karlsruhe (DE)

(72) Inventors: Ganesh Kasiraj, Lindau (DE); Florian Hauler, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/925,165

(22) Filed: Jun. 24, 2013

(65) Prior Publication Data

US 2013/0345944 A1    Dec. 26, 2013

(30) Foreign Application Priority Data

Jun. 22, 2012  (DE) .......... 10 2012 210 608

(51) Int. Cl.
| | |
|---|---|
| *B60W 30/16* | (2012.01) |
| *B60W 40/10* | (2012.01) |
| *B60W 40/02* | (2006.01) |
| *B60W 30/14* | (2006.01) |
| *B60K 31/00* | (2006.01) |
| *G05D 1/02* | (2006.01) |

(52) U.S. Cl.
CPC ............ *B60W 30/16* (2013.01); *B60K 31/0008* (2013.01); *B60W 2420/42* (2013.01); *B60W 2550/10* (2013.01); *B60W 2550/302* (2013.01); *B60W 2550/306* (2013.01); *G05D 1/0246* (2013.01)

(58) Field of Classification Search
CPC ......... B60K 31/0008; B60W 2420/42; B60W 2550/10; B60W 2550/308; B60W 2550/306; B60W 30/16; G05D 1/0246; G05D 1/0293; G01S 17/936; G01S 13/931
See application file for complete search history.

(56) References Cited

U.S. PATENT DOCUMENTS

| | | | | |
|---|---|---|---|---|
| 6,961,661 | B2 * | 11/2005 | Sekiguchi | 701/301 |
| 7,373,237 | B2 * | 5/2008 | Wagner et al. | 701/96 |
| 7,437,243 | B2 * | 10/2008 | Fujimoto | 701/300 |
| 7,561,955 | B2 * | 7/2009 | Kubota | 701/96 |
| 7,881,839 | B2 * | 2/2011 | Stam et al. | 701/36 |
| 8,954,252 | B1 * | 2/2015 | Urmson et al. | 701/70 |
| 2004/0167717 | A1 * | 8/2004 | Buchanan et al. | 701/301 |

(Continued)

FOREIGN PATENT DOCUMENTS

| | | |
|---|---|---|
| DE | 10 2008 061 301 | 6/2009 |
| EP | 2405416 A1 * | 1/2012 |

(Continued)

*Primary Examiner* — Michael J Zanelli
(74) *Attorney, Agent, or Firm* — Kenyon & Kenyon LLP

(57) ABSTRACT

A method is provided for generating a control parameter for a control system of a vehicle, in particular a distance control system. Here, the method may be carried out in conjunction with a vehicle which includes a surroundings detection attachment directed in the driving direction of the vehicle. The method has a step of determining at least one object property of an object in an area in the driving direction ahead of the vehicle by using surroundings data from the surroundings detection attachment. Here, the at least one object property represents a movement state and an object position of the object with regard to a vehicle position of the vehicle and/or with regard to a roadway in the area in the driving direction ahead of the vehicle. The method also includes a step of generating the control parameter as a function of the at least one object property of the object.

20 Claims, 4 Drawing Sheets

(56) References Cited

U.S. PATENT DOCUMENTS

| | | | |
|---|---|---|---|
| 2009/0248270 A1* | 10/2009 | Sekiguchi | 701/96 |
| 2010/0228419 A1* | 9/2010 | Lee et al. | 701/25 |
| 2011/0098892 A1* | 4/2011 | Lundmark et al. | 701/45 |
| 2012/0119894 A1* | 5/2012 | Pandy | 340/435 |
| 2014/0247351 A1* | 9/2014 | Murillo Amaya et al. | 348/148 |

FOREIGN PATENT DOCUMENTS

| | | | |
|---|---|---|---|
| JP | 11-142168 | * | 5/1999 |
| WO | WO2007/124502 A2 | * | 11/2007 |
| WO | WO 2012/047977 | | 4/2012 |

\* cited by examiner

METHOD AND DEVICE FOR GENERATING A CONTROL PARAMETER FOR A DISTANCE CONTROL SYSTEM OF A VEHICLE

FIELD OF THE INVENTION

The present invention relates to a method and a device for generating a control parameter for a distance control system of a vehicle as well as to a corresponding computer program product.

BACKGROUND INFORMATION

So-called "convoy-type driving" or adaptive cruise control (ACC) is a type of a driver assistance system in vehicles which is able to determine the relative position and the relative velocity of a so-called host vehicle in relation to a preceding vehicle and is able to set a setpoint distance by controlling and a setpoint relative velocity by braking and drivetrain intervention. The relative distance is typically determined by a time-of-flight measurement, and the relative velocity by a Doppler measurement of a radar. This is the reason why there are many radar-based ACC systems on the market.

SUMMARY

Against this background, the present invention provides an improved method for generating a control parameter for a distance control system of a vehicle, an improved device for generating a control parameter for a distance control system of a vehicle, and an improved computer program product.

According to the specific embodiments of the present invention, a driver assistance system for "convoy-type driving" or adaptive cruise control (ACC) may, in particular, be controlled by using surroundings data. The surroundings data may, for example, be evaluated using an object detection unit and/or another image processing unit with regard to objects ahead of a vehicle or host vehicle. In particular, a distance and relative velocity measurement of these objects, which is associated therewith and enabled thereby, makes it advantageously possible, for example, to implement an image-based or a video-based distance control system. For example, a behavior of the host vehicle may be adapted with the aid of an image-based distance control system controlled in this way by incorporating a piece of lane information, the position, and, if necessary, the dimensions of stationary or moving objects, as well as a driving direction.

One advantage of the present invention is that with the aid of a method and/or a device according to the specific embodiments of the present invention an image-based distance control system is implementable which, in particular, allows so-called "convoy-type driving" in a safe, reliable, comfortable, and precise manner. Here, a target object selection may be improved in the case of an image-based or video-based distance control system. For example, by taking into consideration a piece of line information, a freely drivable section, and a position of the target vehicle with regard to a so-called travel path of the host vehicle when selecting a target object, a control range of a "convoy-type driving" function may be widened to include fixed or stationary objects and also a control comfort may be increased in the case of lane changing maneuvers and the like. In contrast to radar-based distance control systems or ACC systems, it is also advantageously possible to differentiate stationary vehicles from other stationary objects, such as metallic manhole covers, according to the specific embodiments of the present invention. It is thus also possible to include stationary objects into the generation of control parameters or ACC, since the rate of wrongly detected, stationary objects is advantageously low. In particular also in city traffic, the implementation of a target object selection by incorporating stationary objects is advantageous, since it is avoided that an object in the form of a parked vehicle in the travel path is, for example, declared a target object, thus making a controlled passing possible.

The present invention provides a method for generating a control parameter for a control system of a vehicle, in particular a distance control system, it being possible to carry out the method in conjunction with a vehicle which includes a surroundings detection attachment directed in the driving direction of the vehicle, the method including the following steps:

determining at least one object property of an object in an area in the driving direction ahead of the vehicle by using surroundings data from the surroundings detection attachment, the at least one object property representing a movement state and an object position of the object with regard to a vehicle position of the vehicle and/or with regard to a roadway in the area in the driving direction ahead of the vehicle; and generating the control parameters as a function of the at least one object property of the object.

The vehicle may be a motor vehicle, in particular a road-based motor vehicle, e.g., a passenger car, a truck, or another commercial vehicle. The control system may be a distance control system or a driver assistance system which has a function for "convoy-type driving" or adaptive cruise control. The control parameter is suitable to control the velocity of the vehicle, the control parameter being provided for activating an adaptive cruise control attachment of the vehicle. The surroundings detection attachment may, for example, be installed in an interior of the vehicle. The surroundings detection attachment may have a processing device for processing the surroundings data which were detected by a sensor element of the surroundings detection attachment. The surroundings detection attachment or the processing device may be designed to carry out a light detection, a traffic sign detection, a line detection, and/or an object detection. The surroundings detection attachment may in this case record at least one scan of the surroundings of the vehicle while the vehicle is driving, the scan including the object. The object may be detected in the scan with the aid of a suitable evaluation or object detection. The surroundings detection attachment may have an interface for outputting the surroundings data. The object may be an object on, above, or at least partially next to a roadway on which the vehicle is located. The movement state of the object may represent a movement, a standstill, or an acceleration of the object. The roadway may be a road having at least one lane. With the aid of the object position of the object, it is possible to determine a distance with regard to the vehicle position of the vehicle and additionally or alternatively with regard to a reference property of the roadway. Furthermore, a chronological change of the object position may also be determined In particular, the surroundings detection attachment may be a vehicle camera, an image processing device, and/or the like directed in the forward driving direction and/or backward driving direction of the vehicle. Generally, the surroundings detection attachment may have at least one of multiple types of sensors and/or combinations of the same, which are able to detect object data and lane markings, e.g., lidar or laser scanners, etc. In the case of a 3D system, surroundings data may be detected for both forward driving and backward driving of the vehicle.

Here, in the step of determining, an object category of the object may be determined by using the surroundings data as the object property. Here, the object category may represent another vehicle or an obstacle. The other vehicle may, in particular, be a directly preceding vehicle, with respect to the vehicle, in the same lane of the roadway. The obstacle may be, for example, a parking or standing vehicle in another lane of the roadway, a person, an animal, an infrastructure element, or another object on or next to the roadway, and the like. Such a specific embodiment offers the advantage that it is possible to reliably differentiate between the relevant and the less relevant objects for the generation of the control parameter or the activation of the distance control system.

Also, a step of selecting an object as the target object may be provided when the at least one object property of the object fulfills at least one target object criterion. In the step of generating, a target-object related control parameter may be generated as a function of the at least one object property of the target object. The target object may be an object which represents a reference object for "convoy-type driving." Target object criteria may be a predefinable object position, a predefinable movement state, and a predefinable object category. For example, the target object may be another vehicle which is directly preceding the vehicle and to whose target object velocity the vehicle velocity of the vehicle is adaptable with the aid of the control parameter, so that a definable minimum distance remains between the vehicle and the target object along a driving direction. Such a specific embodiment offers the advantage that safely and comfortably controlled "convoy-type driving" is enabled, it also being possible to reliably keep a safe distance between the vehicle and the target object.

Furthermore, in the step of generating, the control parameter may be generated as a function of the vehicle position of the vehicle with regard to the roadway in the area in the driving direction ahead of the vehicle and additionally or alternatively as a function of the detected driving data of the vehicle. Here, in the step of determining, the vehicle position and, if necessary, a chronological change of the vehicle position may be determined with regard to the roadway in the area in the driving direction ahead of the vehicle. The driving data may be read in by an interface associated with at least one driving data sensor. The driving data may include a velocity of the vehicle, an acceleration of the vehicle, a steering angle of the vehicle, a geographic position of the vehicle, and/or other driver inputs or operating variables. Such a specific embodiment offers the advantage that the control parameter may accurately consider prevailing conditions with respect to the vehicle and its surroundings and thus make "convoy-type driving" more safe and comfortable.

Moreover, a step of providing the control parameter to an interface associated with an adaptive cruise control attachment of the vehicle may be provided. Here, the control parameter may be designed to control the velocity of the vehicle as a function of the at least one object property. Such a specific embodiment offers the advantage that safely controlled "convoy-type driving" is enabled, it being possible to reliably keep a distance between the vehicle and the object.

In particular, in the step of determining, the object position of the object may be determined as the object property with regard to a travel path of the vehicle, ascertained by using the driving data of the vehicle as well as by using the surroundings data, in the area in the driving direction ahead of the vehicle. The travel path may be a travel trajectory or a travel corridor. The vehicle moves in the travel path, the travel path representing a predictable path which the vehicle will travel on the roadway in the very near future. The travel path may have a definable width, possibly including a tolerance area, and a predictable or calculable path profile or route profile. Such a specific embodiment offers the advantage that distances between possible other vehicles and obstacles from predicted future vehicle positions may be considered in the control parameter accurately and at an early stage.

In the step of determining, the object position of the object may also be determined as the object property with regard to a roadway boundary, detected by using the surroundings data, and additionally or alternatively to roadway markings in the area in the driving direction ahead of the vehicle. The roadway boundary may have or represent a lateral edge or edge area of the roadway or the road. The roadway marking may have or represent a light-reflecting area and/or a color which is different from that of the roadway. Here, the roadway marking may be a guide post and additionally or alternatively a boundary line of the roadway, e.g., a median strip or the like. The roadway marking may thus also be a center line, for example, which is essentially interrupted in regular intervals, of the roadway or the like. If roadway markings are temporarily not detectable in the surroundings data, the object position may be estimated with reference to the last known roadway marking position. In this way, it is also possible to estimate the roadway width and the distances, for example. Such a specific embodiment offers the advantage that the object positions, in particular in the case of possible other vehicles as well as obstacles, may be taken into consideration when generating the control parameter, so that "convoy-type driving" may take place reliably, safely, and comfortably based on the control parameter.

According to one specific embodiment, the step of determining may be carried out by using the surroundings data from a vehicle camera, a stereo-video camera, a laser device, a lidar device, and/or a radar device as the surroundings detection attachment. The surroundings detection attachment may in particular be a camera, an image-processing device, and/or the like directed in the driving direction of the vehicle. In this case, the surroundings detection attachment may be a moving-image camera or a video camera. Such a specific embodiment offers the advantage that a determination of a roadway width is made possible with the aid of a stereo-video or motion-stereo camera. Thus, elevated objects may be differentiated from the road surface and it is possible to determine a freely drivable area or a freely drivable section in the area in the driving direction ahead of the vehicle. A target object position of a target object may also be used within the freely drivable area, e.g., by taking into consideration a travel path, in order to advantageously control a velocity of the vehicle with the aid of the control parameter. Furthermore, an object position of an object may also be used within, outside, or at the edge of the freely drivable area, e.g., by taking into consideration a travel path, in order to advantageously control a velocity of the vehicle with the aid of the control parameter. A detection of the free section may advantageously also take place, for example, with the aid of a lidar sensor system, a flash-lidar sensor system or the like.

The present invention furthermore provides a device for generating a control parameter for a control system of a vehicle, in particular a distance control system, the device being designed to carry out or implement the steps of the above-mentioned method. In particular, the device may have attachments which are designed to carry out one step each of the above-mentioned method. This embodiment variant of the present invention in the form of a device also makes it possible to achieve the object underlying the present invention rapidly and efficiently.

In the present case, a device may be understood as an electrical device or a control unit which processes surroundings data and, if necessary, also driving data and outputs control parameters as a function thereof. The device may have an interface which may be designed as hard- and/or software. In the case of a hardware design, the interfaces may, for example, be a part of a so-called ASIC system, which includes various functions of the device. It is, however, also possible that the interfaces are independent, integrated circuits or are at least partially made of discrete components. In the case of software, the interfaces may be software modules which are present on a microcontroller in addition to other software modules, for example.

A computer program product having program code is also advantageous, which is stored on a machine-readable carrier, such as a semiconductor memory, a hard disk memory, or an optical memory, and is used for carrying out the method described above, when the program is executed on a computer or a device.

DETAILED DESCRIPTION

Figure 1:
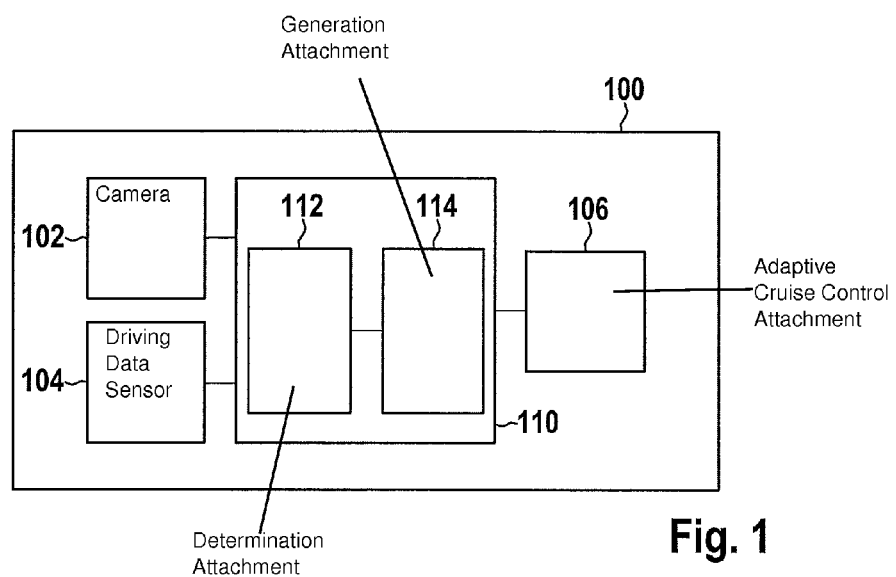
FIG. 1 shows a schematic representation of a vehicle having a device according to one exemplary embodiment of the present invention.

In the following description of preferred exemplary embodiments of the present invention, the elements which are illustrated in the various figures and appear to be similar are identified with identical or similar reference numerals; a repetitive description of these elements is dispensed with.

FIG. 1 shows a schematic representation of a vehicle 100 having a device for generating a control parameter for a distance control system of vehicle 100 according to one exemplary embodiment of the present invention. Vehicle 100 has a surroundings detection attachment 102, e.g., a vehicle camera, a driving data sensor 104, as an example, an adaptive cruise control attachment 106, which is connected to a distance control system or is a part of same, and a device 110 for generating a control parameter for the distance control system of vehicle 100 or a control parameter generation device 110. Control parameter generation device 110 has a determination attachment 112 and a generation attachment 114. Control parameter generation device 110 is connected with the aid of a communication interface, e.g., an electrical line, a wireless connection or the like, directly or indirectly to surroundings detection attachment 102, driving data sensor 104, and adaptive cruise control attachment 106 via other attachments and/or interfaces.

Surroundings detection attachment 102 is situated in vehicle 100 in the form of a vehicle camera according to the exemplary embodiment of the present invention illustrated in FIG. 1, and a viewing direction of the vehicle camera is directed essentially in the driving direction of the vehicle. Thus, surroundings detection attachment 102 is designed to record an image of an area in the driving direction ahead of vehicle 100 and to provide the image data, which belong to the image, as surroundings data.

Driving data sensor 104 may have at least one attachment for detecting driving data, e.g., in the form of a velocity, an acceleration, a steering angle, a geographic position, and/or other driver inputs, state variables, or operating variables of vehicle 100. Driving data sensor 104 is designed to provide driving data.

Control parameter generation device 110 is designed to receive or read in the surroundings data from surroundings detection attachment 102 and, if necessary, the driving data from driving data sensor 104. Determination attachment 112 of control parameter generation device 110 is designed to determine at least one object property of an object in an area in the driving direction ahead of vehicle 100 by using surroundings data from surroundings detection attachment 102. Here, the at least one object property represents a movement state and an object position of the object with regard to a vehicle position of vehicle 100 and/or with regard to a roadway in the area in the driving direction ahead of vehicle 100. Determination attachment 112 may also be designed to determine whether an object detected by using the surroundings data is a target object to which a velocity of vehicle 100 is to be adapted, or another type of object. Generation attachment 114 of control parameter generation device 110 is designed to generate the control parameter as a function of the at least one determined object property of the object. Generation attachment 114 may also be designed to generate the control parameter additionally or alternatively as a function of the driving data from driving data sensor 104. Control parameter generation device 110 is designed to provide the control parameter.

Adaptive cruise control attachment 106 is designed to receive or read in the control parameter from control parameter generation device 110. Adaptive cruise control attachment 106 is also designed to control a velocity of vehicle 100, if necessary, in cooperation with the distance control system or within the scope of same based on the control parameter in the case of an activated "convoy-type driving" function. Thus, a velocity of vehicle 100 or "convoy-type driving" may be adapted to an object in an area in the driving direction ahead of vehicle 100 or an object property of the same with the aid of the control parameter.

Figure 2:
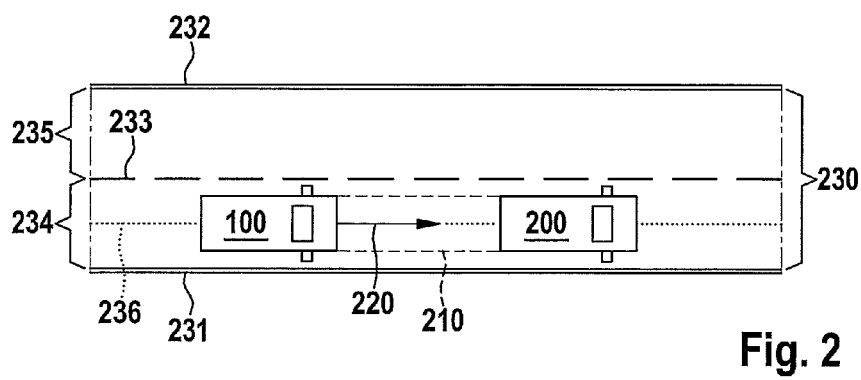
FIGS. 2 through 4 as well as 7 through 9 show schematic representations of traffic situations.

FIG. 2 shows a schematic representation of a traffic situation. A vehicle 100 or a host vehicle, which is the vehicle from FIG. 1, a target object or target in the form of another vehicle 200 or the target vehicle, a travel path 210 of vehicle 100, a driving direction 220 or a movement vector of vehicle 100, a roadway 230 or a road, a first roadway boundary 231, a second roadway boundary 232, a roadway marking 233 in the form of a median strip, a first lane 234, a second lane 235, and a lane center line 236 of first lane 234 are shown.

Roadway 230 is laterally delimited by first roadway boundary 231 and second roadway boundary 232. Roadway 230 is divided into first lane 234 and second lane 235 by roadway marking 233. Vehicle 100 and other vehicle 200 are located in first lane 234 of roadway 230. In this case, other vehicle 200 is located in driving direction 220 ahead of vehicle 100. Vehicle 100 and other vehicle 200 are situated along lane center line 236 of first lane 234. Travel path 210 of vehicle 100 extends in driving direction 220 of vehicle 100 toward other vehicle 200. A width of travel path 210 transversely to driving direction 220 corresponds, as an example, to a width of vehicle 100 transversely to driving direction 220.

In the traffic situation illustrated in FIG. 2, other vehicle 200 is stationary and vehicle 100 moves toward other vehicle 200. It has been detected with the aid of the control parameter generation device of vehicle 100 that other vehicle 200 is a target object. The control parameter generation device of vehicle 100 generates a control parameter which effectuates the velocity of vehicle 100 being controlled in such a way that vehicle 100 comes to a standstill, a safe distance remaining between vehicle 100 and other vehicle 200. Thus, FIG. 2 shows a frequent case or standard case for a distance control system. The control parameter generation device of vehicle 100 enables a target object selection, a target object being determined or detected, so that a distance control system, e.g., for "convoy-type driving," controls vehicle 100 up to the standstill, since other vehicle 200 is already at a standstill.

Figure 3:
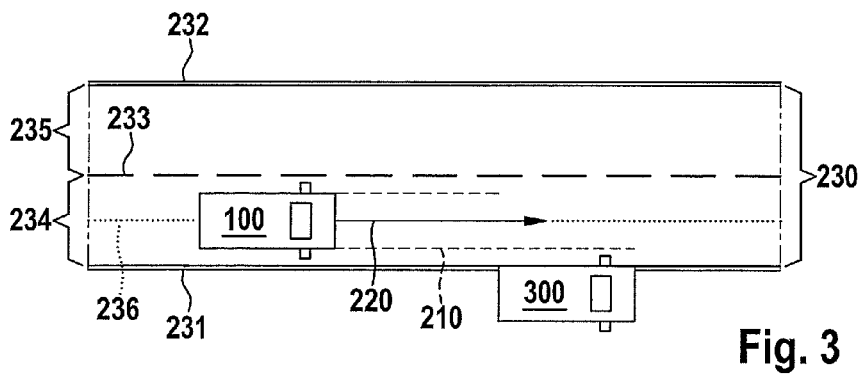

FIG. 3 shows a schematic representation of another traffic situation. Here, the representation in FIG. 3 corresponds to the representation in FIG. 2 with the exception that instead of a target object, an object or obstacle is shown here in the form of another vehicle 300 or object vehicle. Vehicle 100 is the vehicle from FIG. 1 or FIG. 2. As an example, other vehicle 300 is situated in a parking state in an area of first roadway boundary 231. Here, other vehicle 300 extends from an area outside of roadway 230 partially across first roadway boundary 231 into first lane 234. In this case, other vehicle 300 is situated with regard to driving direction 220 of vehicle 100 laterally at a distance from travel path 210 of vehicle 100. In this way, other vehicle 300 is parked outside of travel path 210 of vehicle 100.

In the traffic situation illustrated in FIG. 3, other vehicle 300 is stationary and vehicle 100 moves toward other vehicle 300. Due to a lateral offset of vehicles 100 and 300 in relation to one another, vehicle 100 may laterally move past vehicle 300. It has been detected with the aid of the control parameter generation device of vehicle 100 that other vehicle 300 is an object or an obstacle. The control parameter generation device of vehicle 100 generates a control parameter which effectuates the velocity of vehicle 100 being controlled in such a way that vehicle 100 remains unaffected by other vehicle 300, i.e., that the velocity of vehicle 100 is not adapted to the parking object.

Figure 4:
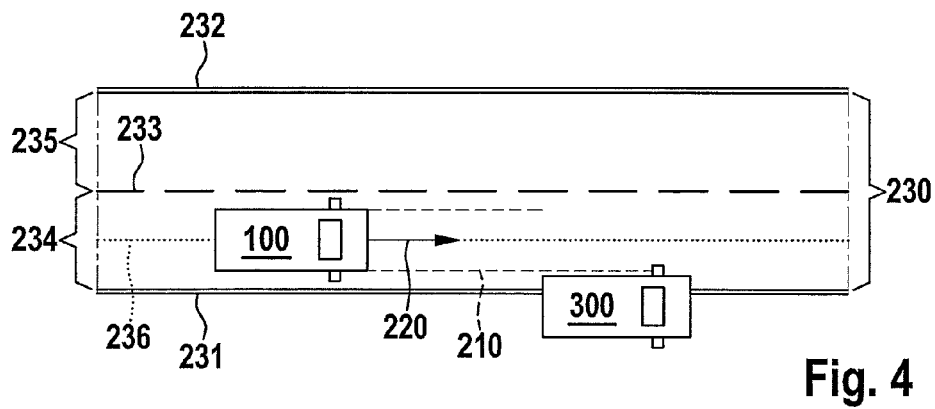

FIG. 4 shows a schematic representation of yet another traffic situation. Here, the representation in FIG. 4 corresponds to the representation in FIG. 3 with the exception that the object or obstacle in the form of other vehicle 300 is parked in such a way that it protrudes into travel path 210 of vehicle 100. Vehicle 100 is the vehicle from FIG. 1, FIG. 2, and FIG. 3. In the traffic situation illustrated in FIG. 4, other vehicle 300 is stationary and vehicle 100 moves toward other vehicle 300. Due to a lateral offset of vehicles 100 and 300 in relation to one another, vehicle 100 may move past vehicle 300 only under certain conditions. It has been detected with the aid of the control parameter generation device of vehicle 100 that other vehicle 300 is an object or an obstacle. The control parameter generation device of vehicle 100 generates a control parameter which effectuates the velocity of vehicle 100 being reduced to enable a safe passing of other vehicle 300.

Figure 5:
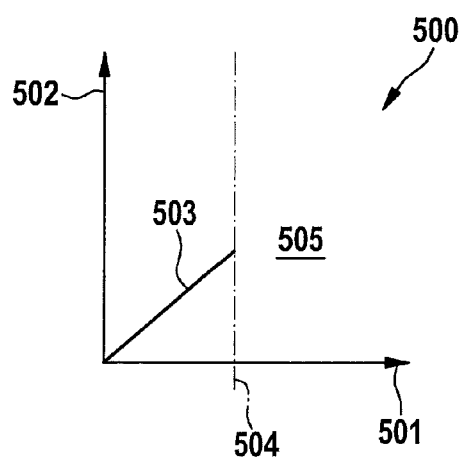
FIGS. 5 and 6 show velocity curves of vehicles.

FIG. 5 shows a representation 500 of a velocity of a vehicle as a function of a lateral distance from another vehicle. Here, the velocity of the vehicle is controlled by a distance control system. Representation 500 is a Cartesian coordinate system. A lateral distance 501, plotted on an abscissa of representation 500, in relation to another vehicle or adjacent vehicle, a maximum velocity 502, plotted on an ordinate of representation 500, of a vehicle or a host vehicle (max $v_{host}$), a velocity curve 503 or graph, a separation line 504 extending in parallel to the ordinate, and an unlimited velocity range 505 are shown. Velocity curve 503 starts at the origin of the coordinate system of representation 500 and increases linearly, as an example, in the positive abscissa direction up to separation line 504. Thus, maximum velocity 502 increases with increasing lateral distance 501 up to separation line 504. In the case of distances which are greater than a limiting distance at the separation line, unlimited velocity range 505 is present. Thus, maximum velocity 502 may be theoretically unlimited in the case of lateral distances which are greater than the limiting distance. The result is a distance-dependent target velocity reduction of a vehicle when passing a stationary vehicle.

Figure 6:
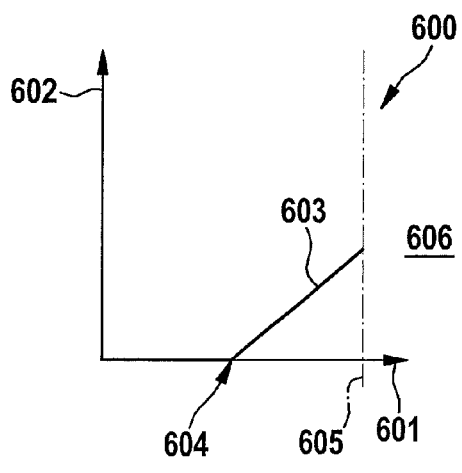

FIG. 6 shows a representation 600 of a velocity of a vehicle as a function of a freely drivable section which results from a roadway width and an immersed width of an object, e.g., a stationary vehicle. Here, the velocity of the vehicle is controlled by a distance control system which uses a control parameter generated by a device such as the control parameter generation device from FIG. 1. Representation 600 is a Cartesian coordinate system. A freely drivable section 601, plotted on an abscissa of representation 600, a maximum velocity 602, plotted on an ordinate of representation 600, of a vehicle or a host vehicle (max $v_{host}$), a velocity curve 603 or graph, an abscissa section 604, whose width corresponds to that of the host vehicle, a separation line 605 extending in parallel to the ordinate, and an unlimited velocity range 606 are shown. Velocity curve 603 starts at abscissa section 604 and increases linearly, as an example, in the positive abscissa direction up to separation line 605. Thus, maximum velocity 602 increases with increasing freely drivable section 601 up to separation line 605. In the case of sections which are greater than a section present at separation line 605, unlimited velocity range 606 is present. Thus, maximum velocity 602 may be theoretically unlimited on freely drivable sections which are greater than the section at separation line 605. A target velocity reduction results when passing a stationary vehicle, taking into consideration the freely drivable section. In this way, it is possible to reach a higher maximum velocity.

With reference to FIGS. 1 through 6, different scenarios according to the exemplary embodiments of the present invention are explained briefly in the following. If vehicle 100 or the host vehicle is driving directly toward stationary vehicle 200, as shown in FIG. 2, the distance control system or ACC effectuates, by using the control parameter of control parameter generation device 110, vehicle 100 coming to a standstill in a timely manner before the target object or target vehicle 200. If vehicle 100 or the host vehicle will drive very closely past an obstacle or object, or another vehicle 300 due to the freely drivable area being very small, the distance control system or ACC effectuates, by using the control parameter of control parameter generation device 110, a maximum velocity not being exceeded by vehicle 100. If there is enough room between stationary vehicle 300 and host vehicle 100 and enough room in relation to the oncoming lane, a velocity may be set which is demanded by a standard ACC.

Figure 7:
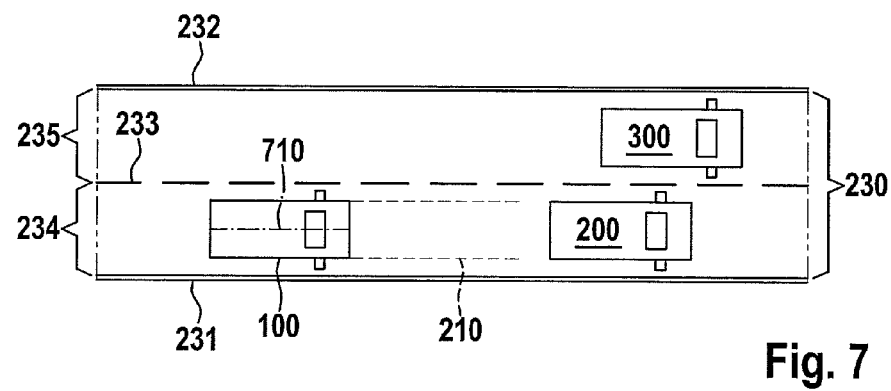

FIG. 7 shows a schematic representation of a traffic situation. Here, the representation in FIG. 7 corresponds to the representation in FIG. 2 with the exception that in addition to target vehicle 200, an object is shown here in the form of another vehicle or object vehicle 300, that the lane center line of first lane 234 has been omitted here, and that a vehicle longitudinal axis 710 of vehicle 100 is illustrated. Vehicle 100 is the vehicle from FIG. 1, FIG. 2, FIG. 3, and FIG. 4. Target vehicle 200 moves in first lane 234 in the driving direction ahead of vehicle 100 in the same direction as vehicle 100. Object vehicle 300 moves in second lane 235 in the driving direction ahead of vehicle 100 in the same direction as vehicle 100. Here, as an example, object vehicle 300 is at a farther distance from vehicle 100 than target vehicle 200. Target vehicle 200 and object vehicle 300 were detected with the aid of the control parameter generation device of vehicle 100.

The control parameter generation device of vehicle 100 generates a control parameter which effectuates the velocity of vehicle 100 being adapted to the velocity of target vehicle 200, with a safe distance remaining between them.

Figure 8:
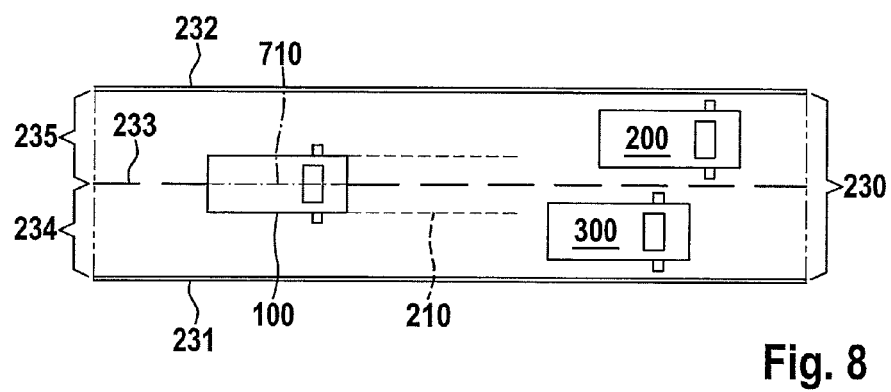

FIG. 8 shows a schematic representation of another traffic situation. Here, the representation in FIG. 8 corresponds to the representation in FIG. 7 with the exception that the other vehicle in first lane 234 was detected here as object vehicle 300 with the aid of the control parameter generation device of vehicle 100, that the other vehicle in second lane 235 was detected as target vehicle 200 with the aid of the control parameter generation device of vehicle 100, and that vehicle 100 has moved partially from a central position within first lane 234 into second lane 235, vehicle longitudinal axis 710 of vehicle 100 having crossed roadway marking 233 and being situated in second lane 235. Vehicle 100 is the vehicle from FIG. 1, FIG. 2, FIG. 3, FIG. 4, and FIG. 7. Here, a distance of vehicle 100 from object vehicle 300 may also be reduced, for example, to assist a passing maneuver and to generate a dynamic driving experience.

With reference to FIGS. 7 and 8 and with back-reference to FIG. 1, a target object change is explained briefly in the following in the case of crossing a roadway marking, e.g., on a highway or another multi-lane roadway. Outside of an application scope with regard to stationary objects, the lane information is also useful when selecting the target object. In this way, target vehicle 200 and object vehicle 300 may be assigned rapidly and reliably to a lane 234 or 235 during a lane change, e.g., on highways, with the aid of surroundings detection attachment 102 and control parameter generation device 110 of vehicle 100. If host vehicle 100 crosses roadway marking 233 with its vehicle longitudinal axis 710, host vehicle 100 may be assigned to another lane and target vehicle 200 may change. Moreover, a lane change may be detected earlier when a lateral velocity of vehicle 100 is evaluated with respect to roadway marking 233. If host vehicle 100 moves at a lateral velocity $v > v_{limit}$ so that roadway marking 233 is crossed within a defined time period (TOL: time-to-line crossing), a lane change maneuver may be deduced earlier and target vehicle 200 may change earlier.

Figure 9:
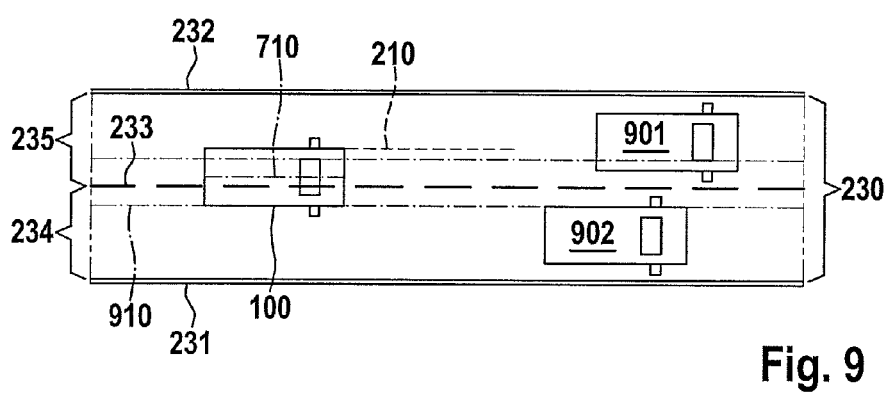

FIG. 9 shows a schematic representation of a traffic situation. Here, the representation in FIG. 9 corresponds to the representation in FIG. 8 with the exception that the other vehicle in first lane 234 was detected here as a first target vehicle 901 with the aid of the control parameter generation device of vehicle 100, that the other vehicle in second lane 235 was detected as a second target vehicle 902 with the aid of the control parameter generation device of vehicle 100, and that a transition area 910 is shown which extends on both sides along roadway marking 233 and has a width which, as an example, is smaller than a width of one of lanes 234 and 235. Vehicle 100 is the vehicle from FIG. 1, FIG. 2, FIG. 3, FIG. 4, FIG. 7, and FIG. 8. Vehicle 100 is partially located in transition area 910. The control parameter generation device of vehicle 100 generates a control parameter which effectuates it being influenceable by both target vehicles 901 and 902, the velocity of vehicle 100 being adapted to that of target vehicles 901 and 902 which has the smaller distance to vehicle 100 and the lower velocity. This results in a control with respect to two target vehicles 901 and 902 in transition area 910. Thus, in transition area 910 of the two lanes 234 and 235, the two other vehicles may also be selected for control as target vehicles 901 and 902, the smallest distance and the lowest velocity of the two vehicles being essential. Here, a distance of vehicle 100 from at least one of target vehicles 901 and 902 may also be reduced, for example, to assist a passing maneuver and to generate a dynamic driving experience.

Figure 10:
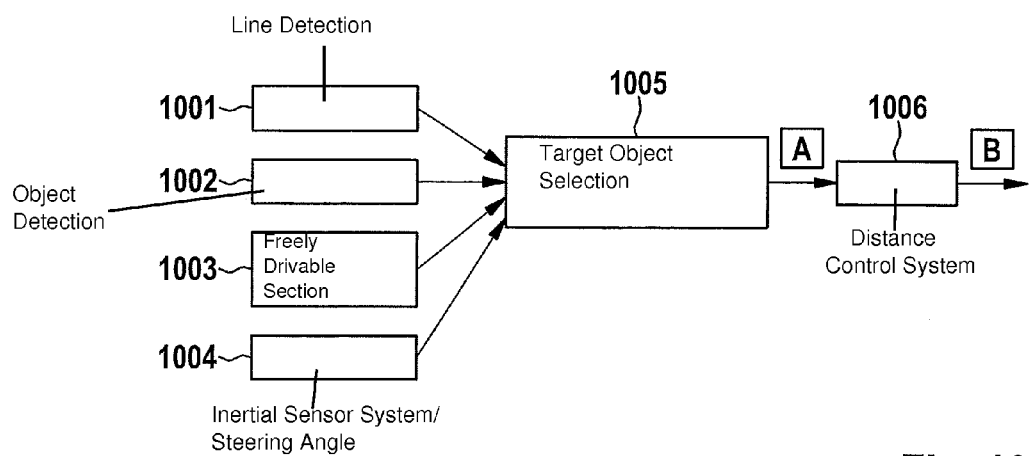
FIG. 10 shows a schematic representation of a signal flow in a vehicle having a device according to one exemplary embodiment of the present invention.

FIG. 10 shows a signal flow chart in a vehicle having a device according to one exemplary embodiment of the present invention. Vehicle 100 may be the vehicle from FIG. 1, FIG. 2, FIG. 3, FIG. 4, FIG. 7, FIG. 8, and FIG. 9. The device may be the control parameter generation device from FIG. 1. FIG. 10 shows information 1001 regarding line detection, information 1002 regarding object detection, information 1003 regarding the detection of the freely drivable section, and information 1004 of the inertial sensor system as well as regarding the steering angle. These pieces of information 1001, 1002, 1003, and 1004 are supplied to a device 1005 for target object selection and velocity limitation which may, for example, correspond to at least a part of the control parameter generation device. This is where the target object selection is carried out. In an interface at a point A, the target object distance and the relative velocity, as well as a velocity limitation are forwarded to a distance control system 1006, an ACC for example. At point B, control information, e.g., a setpoint acceleration, is forwarded to the drivetrain and the brake. A linkage to the input data from a user interface may also be provided, an activation of distance control system 1006, a type of confirmation of a target object selection, and/or the like being made possible, for example.

Figure 11:
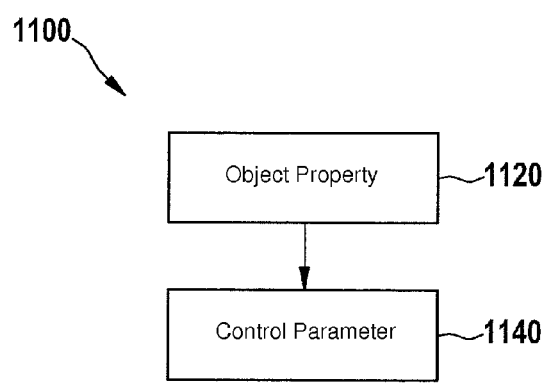
FIG. 11 shows a flow chart of a method according to one exemplary embodiment of the present invention.

FIG. 11 shows a flow chart of a method 1100 for generating a control parameter for a distance control system of a vehicle according to one exemplary embodiment of the present invention. Here, method 1100 may be carried out in conjunction with a vehicle which includes a surroundings detection attachment directed in the driving direction of the vehicle. Thus, method 1100 may, for example, be carried out in conjunction with the vehicle from one of FIGS. 1 through 4, as well as 7 through 9. Method 1100 has a step of determining 1120 at least one object property of an object in an area in the driving direction ahead of the vehicle by using surroundings data from the surroundings detection attachment. Here, the at least one object property represents a movement state and an object position of the object with regard to a vehicle position of the vehicle and additionally or alternatively with regard to a roadway in the area in the driving direction ahead of the vehicle. Method 1100 also has a step of generating 1140 the control parameter as a function of the at least one object property of the object. Method 1100 may also be advantageously carried out in conjunction with the device from FIG. 1. Thus, the device from FIG. 1 may be designed to carry out the steps of method 1100.

The exemplary embodiments described and shown in the figures have only been selected as examples. Different exemplary embodiments may be combined with each other in their entirety or with regard to their individual features. Also, one exemplary embodiment may be supplemented with features of another exemplary embodiment. Furthermore, method steps according to the present invention may be repeated and executed in a sequence different from the one described.

What is claimed is:

1. A method for generating a control parameter for a control system of a vehicle, the method comprising:
 determining at least one object property of an object in an area in a driving direction ahead of the vehicle by using surroundings data from a surroundings detection attachment, the at least one object property representing a movement state and an object position of the object with regard to a roadway in the area of the driving direction ahead of the vehicle; and
 generating the control parameter as a function of the at least one object property of the object, wherein the method is capable of being carried out in conjunction with the vehicle including the surroundings detection attachment directed in the driving direction of the vehicle.

2. The method as recited in claim 1, wherein the step of determining includes determining an object category of the object as the object property by using the surroundings data, the object category representing one of another vehicle and an obstacle.

3. The method as recited in claim 2, wherein the obstacle is one of a parked vehicle, a person, an animal, an infrastructure element, or another object on the roadway.

4. The method as recited in claim 1, further comprising:
   selecting the object as a target object when the at least one object property of the object fulfills at least one target object criterion,
   wherein the step of generating includes generating a target-object related control parameter as a function of the at least one object property of the target object.

5. The method as recited in claim 4, wherein the target object is another vehicle that directly precedes the vehicle.

6. The method as recited in claim 4, wherein the at least one target object criterion is one of a predefinable object position, a predefinable movement state, and a predefinable object category.

7. The method as recited in claim 1, wherein the step of generating includes generating the control parameter as a function of at least one of:
   the vehicle position of the vehicle with regard to the roadway in the area in the driving direction ahead of the vehicle, and
   detected driving data of the vehicle.

8. The method as recited in claim 7, wherein the driving data is one of: a velocity of the vehicle, an acceleration of the vehicle, a steering angle of the vehicle, a geographic position of the vehicle, a driver input of the vehicle, and an operating variable of the vehicle.

9. The method as recited in claim 1, further comprising:
   providing the control parameter to an interface associated with an adaptive cruise control attachment of the vehicle, wherein the control parameter controls a velocity of the vehicle as a function of the at least one object property.

10. The method as recited in claim 1, wherein the step of determining includes:
    determining the object position of the object as the object property with regard to a travel path of the vehicle, ascertained by using driving data of the vehicle as well as by using the surroundings data, in the area in the driving direction ahead of the vehicle.

11. The method as recited in claim 10, wherein the travel path is a predictable path which the vehicle will travel on the roadway in the near future, and wherein the travel path has a definable width.

12. The method as recited in claim 10, wherein the travel path is one of a travel trajectory or a travel corridor.

13. The method as recited in claim 1, wherein the step of determining includes determining the object position of the object as the object property with regard to a roadway boundary, detected by using at least one of the surroundings data and a roadway marking in the area in the driving direction ahead of the vehicle.

14. The method as recited in claim 1, wherein the step of determining is carried out by using the surroundings data from at least one of a vehicle camera, a stereo-video camera, a laser device, a lidar device, and a radar device as the surroundings detection attachment.

15. The method as recited in claim 14, wherein the surroundings data is collected in at least one of a forward driving direction and a backward driving direction of the vehicle.

16. The method as recited in claim 1, wherein the control system includes a distance control system.

17. The method as recited in claim 1, wherein a processing device of the surroundings detection attachment is configured to carry out at least one of a: light detection, a traffic sign detection, and an object detection.

18. A device for generating a control parameter for a control system of a vehicle, the device comprising:
    an arrangement for determining at least one object property of an object in an area in a driving direction ahead of the vehicle by using surroundings data from a surroundings detection attachment, the at least one object property representing a movement state and an object position of the object with regard to a roadway in the area of the driving direction ahead of the vehicle; and
    an arrangement for generating the control parameter as a function of the at least one object property of the object.

19. The method as recited in claim 18, wherein the control system includes a distance control system which is one of connected to or inclusive of the arrangement for determining at least one object property of an object.

20. A computer program product having program code for carrying out a method comprising:
    determining at least one object property of an object in an area in a driving direction ahead of a vehicle by using surroundings data from a surroundings detection attachment, the at least one object property representing a movement state and an object position of the object with regard to a roadway in the area of the driving direction ahead of the vehicle; and
    generating a control parameter as a function of the at least one object property of the object.

\* \* \* \* \*